US011942725B1

(12) United States Patent
Baldwin et al.

(10) Patent No.: US 11,942,725 B1
(45) Date of Patent: *Mar. 26, 2024

(54) TAMPER-RESISTANT NIGHTLIGHT WITH TOUCH-SENSITIVE SURFACE

(71) Applicant: Titan3 Technology LLC, Tempe, AZ (US)

(72) Inventors: Jeffrey P. Baldwin, Anthem, AZ (US); John E. Klein, Chandler, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,197

(22) Filed: Feb. 21, 2023

Related U.S. Application Data

(63) Continuation-in-part of application No. 17/736,016, filed on May 3, 2022, now Pat. No. 11,588,276, which is a continuation of application No. 17/224,045, filed on Apr. 6, 2021, now Pat. No. 11,322,892, which is a continuation of application No. 16/750,956, filed on Jan. 23, 2020, now Pat. No. 10,971,860.

(60) Provisional application No. 62/820,356, filed on Mar. 19, 2019, provisional application No. 62/795,805, filed on Jan. 23, 2019.

(51) Int. Cl.

| | |
|---|---|
| ***H01R 13/639*** | (2006.01) |
| ***F21V 23/04*** | (2006.01) |
| ***F21V 23/06*** | (2006.01) |
| ***F21V 25/02*** | (2006.01) |
| ***F21Y 115/10*** | (2016.01) |
| ***H01R 13/50*** | (2006.01) |
| ***H01R 13/70*** | (2006.01) |
| ***H01R 13/717*** | (2006.01) |

(52) U.S. Cl.
CPC ..... *H01R 13/6395* (2013.01); *F21V 23/0464* (2013.01); *F21V 23/06* (2013.01); *F21V 25/02* (2013.01); *H01R 13/50* (2013.01); *H01R 13/701* (2013.01); *H01R 13/7175* (2013.01); *F21Y 2115/10* (2016.08)

(58) Field of Classification Search
CPC ... F21S 8/035; H01R 25/006; H01R 13/6395; H01R 13/50; H01R 13/701; H01R 13/7175; F21V 25/02; F21V 23/0464; F21V 23/06; F21Y 2115/10
See application file for complete search history.

(56) References Cited

U.S. PATENT DOCUMENTS 3,739,226 A 6/1973 Seiter
4,000,405 A 12/1976 Horwinski
(Continued)

*Primary Examiner* — Thomas M Sember
(74) *Attorney, Agent, or Firm* — BOOTH UDALL FULLER, PLC; Kenneth C. Booth

(57) ABSTRACT

A tamper resistant nightlight for placement in an electrical receptacle, the nightlight includes a body that has a base with an LED circuit and plug blades extending from the body. A housing includes a locking element configured to restrict a child from removing the nightlight from the electrical receptacle through a flange that extends away from the body to be positioned behind a rear surface of an electrical wall plate associated with the electrical receptacle to prevent the tamper resistant nightlight from being removed from the electrical receptacle while the electrical wall plate is coupled to the electrical receptacle.

11 Claims, 9 Drawing Sheets

(56) References Cited

U.S. PATENT DOCUMENTS

| | | | | |
|---|---|---|---|---|
| 4,484,185 | A | 11/1984 | Graves | |
| 4,546,419 | A | 10/1985 | Johnson | |
| 4,915,638 | A | 4/1990 | Domian | |
| 5,964,516 | A | 10/1999 | Lai | |
| 6,045,232 | A | 4/2000 | Buckmaster | |
| 6,883,927 | B2 | 4/2005 | Cunningham | |
| 7,247,793 | B2 | 7/2007 | Hinkson | |
| 7,874,717 | B1 | 1/2011 | Shaefer | |
| 8,304,652 | B2 | 11/2012 | McBain | |
| 8,393,747 | B2 | 3/2013 | Kevelos | |
| 8,674,221 | B2 * | 3/2014 | Yang | H01H 9/161 174/67 |
| 9,970,641 | B2 | 5/2018 | Mousavi | |
| 10,305,216 | B1 | 5/2019 | Shotey | |
| 10,446,970 | B2 | 10/2019 | Shotey | |
| 10,644,465 | B2 | 5/2020 | O'Reilly | |
| 10,720,727 | B1 | 7/2020 | Shotey | |
| 2006/0073731 | A1 | 4/2006 | Chien | |
| 2015/0276178 | A1 * | 10/2015 | Chien | G03B 21/001 362/95 |
| 2017/0356638 | A1 * | 12/2017 | Mousavi | F21S 8/035 |
| 2018/0316145 | A1 | 11/2018 | McKiernan | |

* cited by examiner

TAMPER-RESISTANT NIGHTLIGHT WITH TOUCH-SENSITIVE SURFACE

CROSS REFERENCE TO RELATED APPLICATIONS

This application is a continuation-in-part of U.S. Utility patent application Ser. No. 17/736,016 entitled "Tamper-Resistant Nightlight" to Jeffrey P. Baldwin and John E. Klein that was filed on May 3, 2022, which application is a continuation of U.S. Utility patent application Ser. No. 17/224,045 entitled "Tamper-Resistant Nightlight" to Jeffrey P. Baldwin and John E. Klein that was filed on Apr. 6, 2021, now issued as U.S. Pat. No. 11,322,892, which application is a continuation of U.S. Utility patent application Ser. No. 16/750,956 entitled "Tamper-Resistant Nightlight" to Jeffrey P. Baldwin and John E. Klein that was filed on Jan. 23, 2020, now issued as U.S. Pat. No. 10,971,860, which claims the benefit of the filing date of U.S. Provisional Patent Application 62/795,805 entitled "Safety Nightlight" to Jeffrey P. Baldwin and John E. Klein that was filed on Jan. 23, 2019, as well as the benefit of the filing date of U.S. Provisional Patent Application 62/820,356 entitled "Tamper Resistant Nightlight" to Jeffrey P. Baldwin and John E. Klein that was filed on Mar. 19, 2019, the disclosures of each of which are hereby incorporated herein by this reference.

TECHNICAL FIELD

This application relates to the field of nightlights, and more specifically to tamper-resistant nightlights.

BACKGROUND

Nightlights are small light fixture, usually electrical, placed for comfort or convenience in dark areas or areas that may become dark at certain times, such as at night or in an emergency. Nightlights are sometimes battery powered, and sometimes have a cord that allows them to be plugged into an electrical receptacle at an electrical outlet while being positioned away from the electrical receptacle. Nightlights are sometimes plugged into an electrical receptacle without an electrical cord, providing light at the location of, or in the proximity to, the electrical outlet.

SUMMARY

According to an aspect of the disclosure, a tamper resistant nightlight may comprise a body with a base that is configured to be disposed over a face of an electrical receptacle, at least one circuit disposed over the base, the at least one circuit comprising at least one light emitting diode (LED), and a cover that is aligned with, and disposed over the at least one LED, the cover configured to be visible when the tamper resistant nightlight is plugged into the electrical receptacle, plug blades extending from the body and electrically coupled to the at least one circuit, the plug blades configured to electrically couple with contacts within the electrical receptacle, and a housing coupled to the body, the housing comprising a locking element configured to restrict a child from removing the tamper resistant nightlight from the electrical receptacle, the locking element configured as a flange that extends away from the body such that a distal edge of the flange is configured to be positioned behind a rear surface of an electrical wall plate associated with the electrical receptacle to prevent the tamper resistant nightlight from being removed from the electrical receptacle while the electrical wall plate is coupled to the electrical receptacle.

Particular embodiments may comprise one or more of the following features. The housing may comprise a translucent material and is disposed over a front of the cover, and the base may be configured to contact, and be adjacent to, the face of the electrical receptacle. The housing may be disposed over a side of the cover and is not disposed over a front of the cover, and the base may be configured to contact, and be adjacent to, the face of the electrical receptacle. The housing may be coupled to the base with a keyhole connector, the housing comprising slots through which the plug blades may extend when the housing is disposed between the electrical receptacle and the base. The at least one circuit may comprise a photosensor circuit, the tamper resistant nightlight further comprising a photosensor coupled to the photosensor circuit and configured to detect ambient light and turn on the tamper resistant when ambient light is low and turn off the tamper resistant when ambient light is adequate. A selector switch moveable from a first position in which the tamper resistant is always on and a second position in which the tamper resistant is controlled by the photosensor circuit. A portion of the flange may be disposed between a perimeter of an opening through the electrical wall plate and the electrical receptacle face, and the flange comprises a thickness in a range of 0.5 mm-4 mm and is configured to extend along an edge of the electrical receptacle opening. The cover and the housing may be formed as a single piece.

According to an aspect of the disclosure, a tamper resistant nightlight may comprise a body comprising a base that is configured to be disposed over a face of an electrical receptacle, at least one circuit disposed over the base, the at least one circuit comprising at least one light, and a cover that is aligned with, and disposed over the at least one LED, the cover configured to be visible when the tamper resistant is plugged into the electrical receptacle, and plug blades extending from the body and coupled to the at least one circuit, the plug blades configured to electrically couple with contacts within the electrical receptacle, and a housing coupled to the body, the housing comprising a locking element configured to couple with an electrical wall plate and restrict a child from removing the tamper resistant.

Particular embodiments may comprise one or more of the following features. The locking element may be configured as a flange that extends away from the body such that a distal edge of the flange is configured to be positioned behind a rear surface of the electrical wall plate to prevent the tamper resistant nightlight from being removed from the electrical receptacle while the electrical wall plate is coupled to the electrical receptacle. The cover and the housing may be formed as a single piece. The housing may comprise a translucent material and is disposed over a front of the cover, and the base is configured to contact, and be adjacent to, the face of the electrical receptacle. The housing may be disposed over a side of the cover and not disposed over a front of the cover, and the base may be configured to contact, and be adjacent to, the face of the electrical receptacle. The housing may be coupled to the base with a keyhole connector, the housing comprising slots through which the plug blades may extend when the housing is disposed between the electrical receptacle and the base.

According to an aspect of the disclosure, a tamper resistant nightlight may comprise a body comprising at least one light, plug blades extending from the body and coupled to the at least one light, the plug blades configured to electrically couple with contacts within an electrical receptacle, and a housing coupled to the body, the housing comprising a locking element configured to couple with an electrical wall plate and restrict a child from removing the tamper resistant.

Particular embodiments may comprise one or more of the following features. The locking element may be configured as a flange that extends away from the body such that a distal edge of the flange is configured to be positioned behind a rear surface of the electrical wall plate to prevent the tamper resistant nightlight from being removed from the electrical receptacle while the electrical wall plate is coupled to the electrical receptacle. The body and the housing may be formed as a single piece. The body may comprise a translucent material, and a base of the body is configured to directly contact, and be adjacent to, a face of the electrical receptacle. The housing may be disposed over a side of the body and is not disposed over a front of the body, and a base of the body is configured to contact, and be adjacent to, the face of the electrical receptacle. The housing may be coupled to the body with a keyhole connector, the housing comprising slots through which the plug blades may extend when the housing is disposed between the electrical receptacle and the body.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

DETAILED DESCRIPTION

Figure 1:
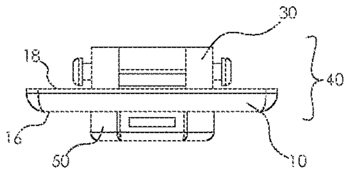
FIG. 1 shows a top view of a tamper resistant nightlight coupled with an electrical outlet.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

The present disclosure concerns a tamper-resistant night light. This tamper-resistant night light provides a night light which is trapped by the electrical wall plate to restrict a child from unplugging it. A variety of different implementations of the tamper-resistant night light are discussed below. Generally, these implementations may comprise a night light and a locking element. It should be understood that the components depicted and discussed are non-limiting examples, and that the contemplated components may be combined with any of the other components in other implementations.

Figure 4:
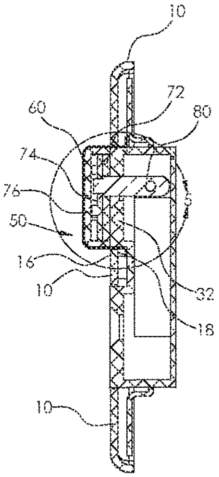
FIG. 4 shows a cross-sectional side view of the tamper resistant nightlight and electrical outlet taken along section-line 4 shown in FIG. 2.
Figure 5:
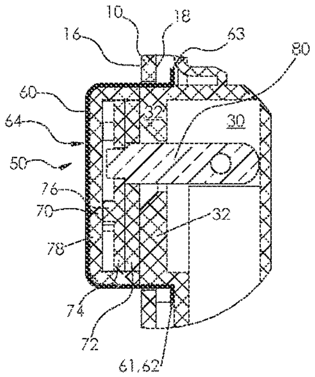
FIG. 5 shows a close-up cross-sectional side view of the tamper resistant nightlight and electrical outlet taken along section-line 5 shown in FIG. 4.
Figure 6:
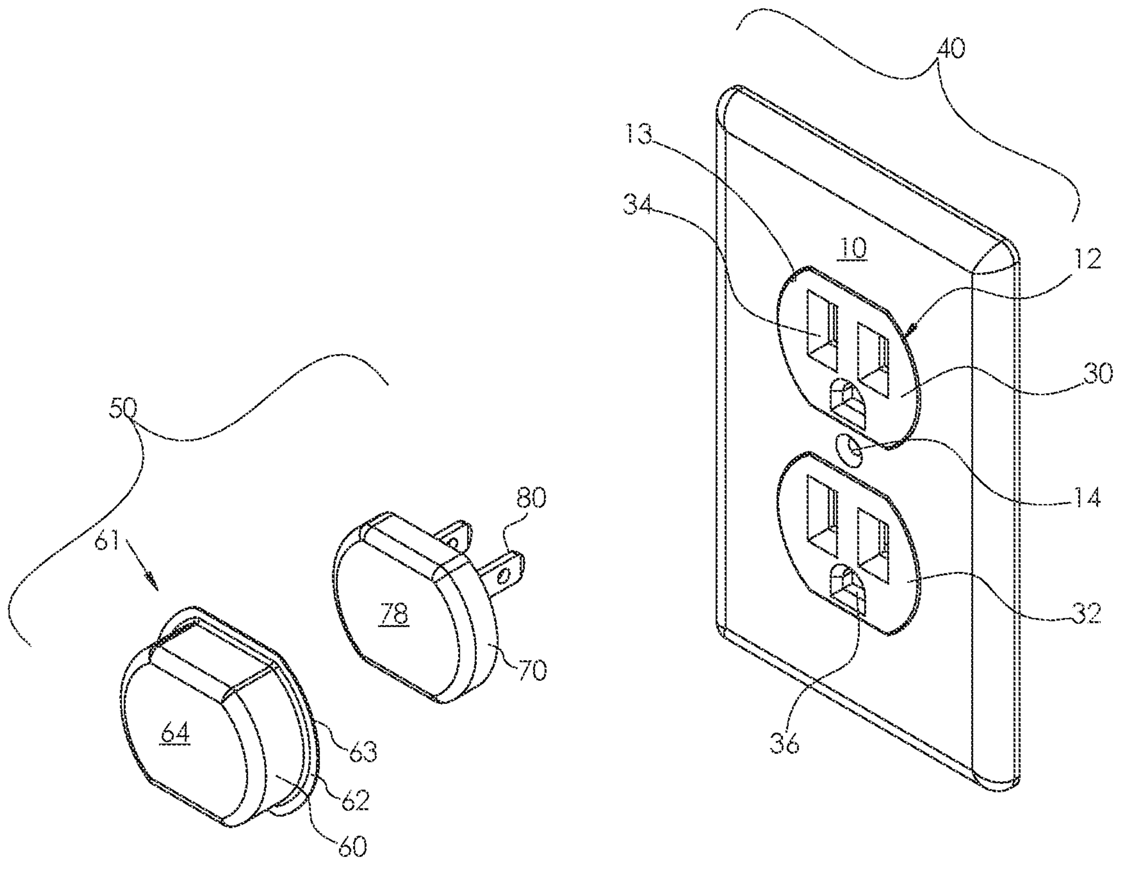
FIG. 6 shows an exploded perspective view of the tamper resistant nightlight and electrical outlet shown in FIGS. 1-5.
Figure 7:
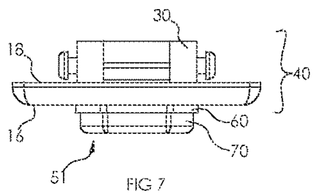
FIG. 7 shows a top view of another instance of a tamper resistant nightlight coupled with an electrical outlet.
Figure 8:
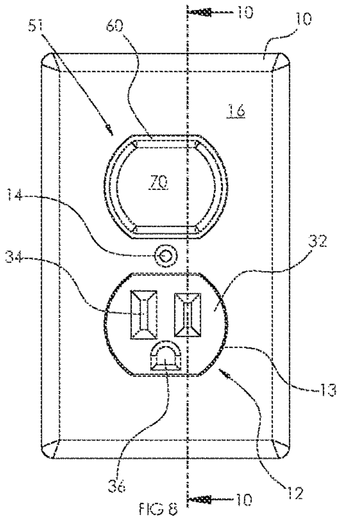
FIG. 8 shows a front view of the tamper resistant nightlight and electrical outlet of FIG. 7.
Figure 9:
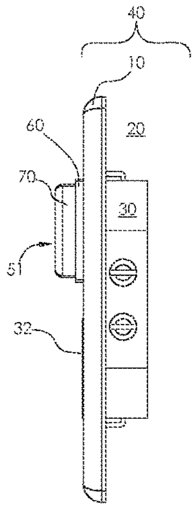
FIG. 9 shows a side view of the tamper resistant nightlight and electrical outlet of FIG. 7.
Figure 10:
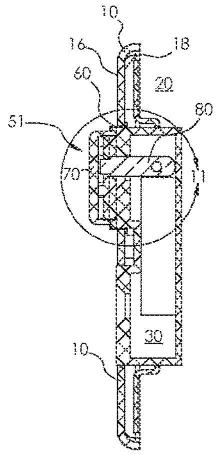
FIG. 10 shows a cross-sectional side view of the tamper resistant nightlight and electrical outlet taken along section-line 10 shown in FIG. 8.
Figure 11:
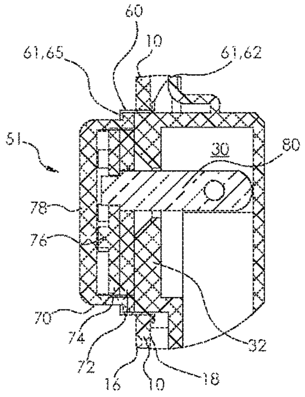
FIG. 11 shows a close-up cross-sectional side view of the tamper resistant nightlight and electrical outlet taken along section-line 11 shown in FIG. 10.
Figure 12:
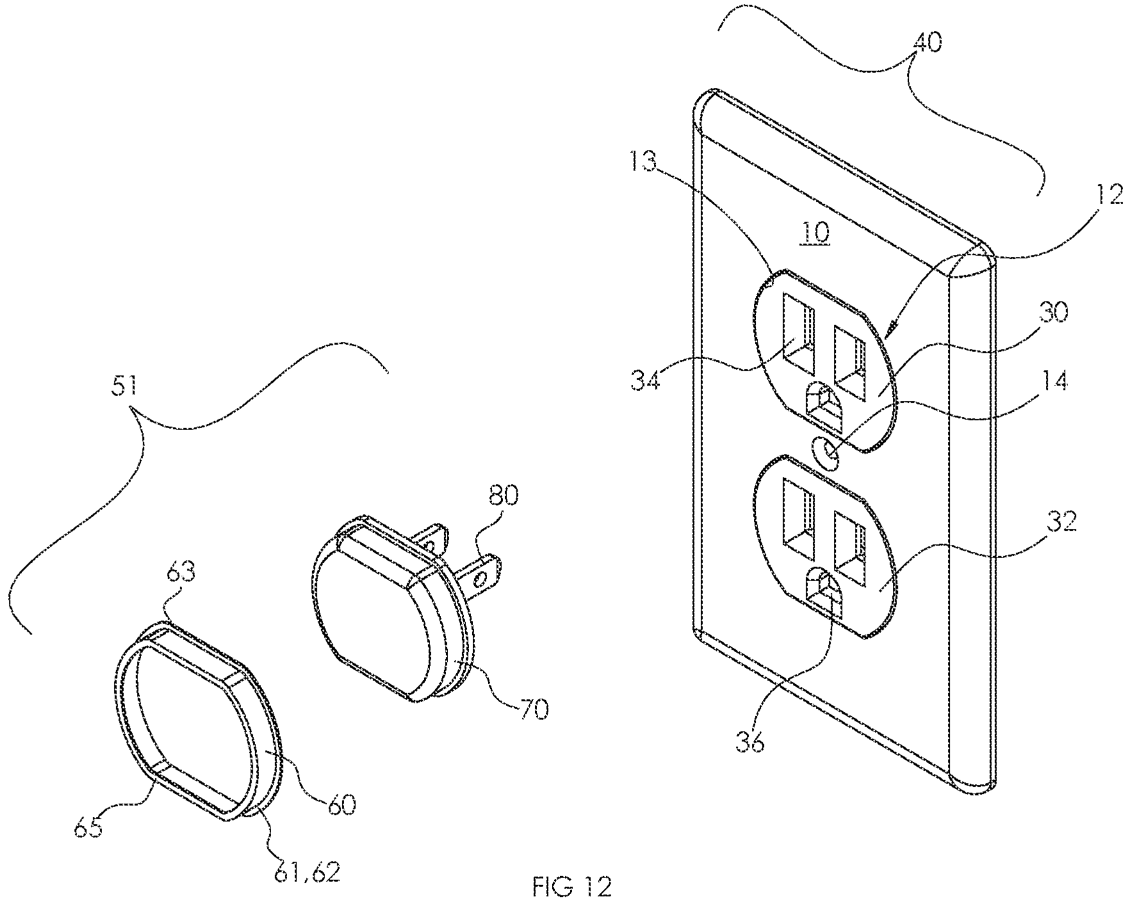
FIG. 12 shows an exploded perspective view of the tamper resistant nightlight and electrical outlet shown in FIGS. 7-11.
Figure 13:
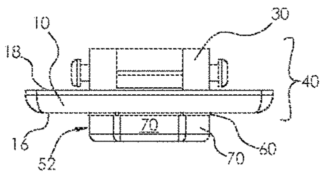
FIG. 13 shows a top view of another instance of a tamper resistant nightlight coupled with an electrical outlet.
Figure 14:
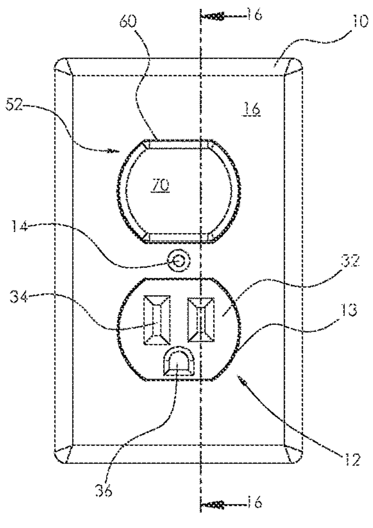
FIG. 14 shows a front view of the tamper resistant nightlight and electrical outlet of FIG. 13.
Figure 15:
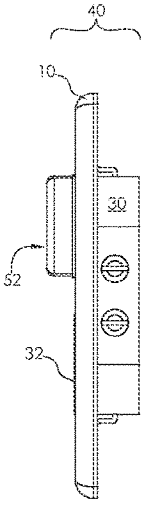
FIG. 15 shows a side view of the tamper resistant nightlight and electrical outlet of FIG. 13.
Figure 16:
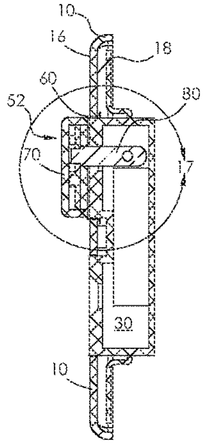
FIG. 16 shows a cross-sectional side view of the tamper resistant nightlight and electrical outlet taken along section-line 16 shown in FIG. 14.
Figure 17:
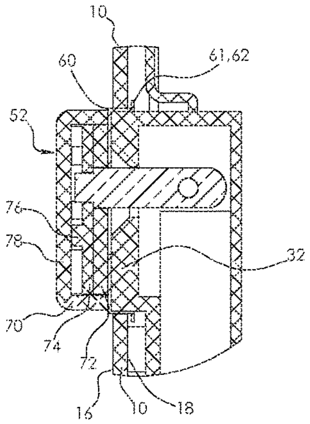
FIG. 17 shows a close-up cross-sectional side view of the tamper resistant nightlight and electrical outlet taken along section-line 11 shown in FIG. 16.

FIGS. 1-6 show various views of an aspect of a tamper resistant nightlight 50. FIG. 6 shows an exploded perspective view of the nightlight 50, comprising a housing or nightlight housing 60 and a body or nightlight body 70. The nightlight 50 may be coupled to an electrical wall plate, faceplate, or cover 10, such as a duplex electrical receptacle wall plate and a receptacle or electrical receptacle 30, such as a duplex receptacle. FIGS. 1-6 illustrate an implementation in which the housing 60 (which comprises the locking element 61) covers the front or cover 78 of the night light 70 and has a flange or lip 62 around an edge or perimeter of the nightlight 70.

FIG. 1 shows a top view of an outlet 40 comprising the wall plate 10 and the receptacle 30. The wall plate 10 is shown coupled to the receptacle 30, the wall plate 10 comprising a front surface or first surface 16 oriented away from a wall and oriented towards an open space or passerby. The wall plate 10 also comprises a rear surface or second surface 18 oriented towards a wall and oriented away from an open space or passerby. FIG. 1 also shows the nightlight 50 plugged into the receptacle 30. The wall plate 10 may be formed of rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials, plastics and/or other like materials; composites and/or other like materials, metals, such as zinc, magnesium, titanium, copper, iron, steel, carbon steel, alloy steel, tool steel, stainless steel, spring steel, aluminum, and/or other like materials, ceramic, stone, wood, cellulose, or other natural material, and/or any combination or composite of the foregoing.

The wall plate 10 may be made by, with, or involve 3-D printing, extrusion, pultrusion, vacuum forming, injection molding, blow molding, resin transfer molding, casting, forging, cold rolling, milling, drilling, reaming, turning, grinding, stamping, cutting, carving, bending, welding, soldering, hardening, riveting, punching, plating, and/or the like. The wall plate 10 may be a standard off the shelf wall plate, as well as a custom plate, the tamper resistant nightlight being compatible with both.

Figure 2:
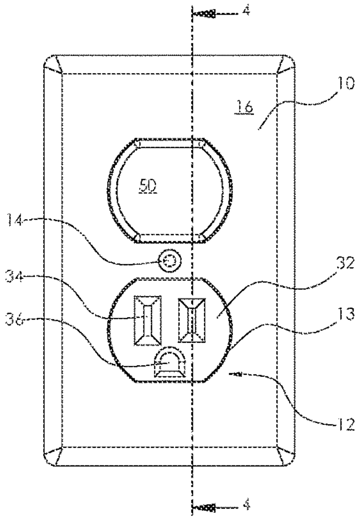
FIG. 2 shows a front view of the tamper resistant nightlight and electrical outlet of FIG. 1.

FIG. 2 shows a front view of the wall plate 10 coupled to the receptacle 30, and the nightlight 50 coupled to the wall plate 10 and the receptacle 30. The view of FIG. 2 is perpendicular or orthogonal to the view shown in FIG. 1. The view of FIG. 2 presents the wall plate 10, the receptacle 30, and the nightlight 50 as would be seen from an open space or by a passerby. The nightlight 50 is shown coupled to the upper face 32 of the receptacle 30, the lower face 32 of the receptacle being visible or exposed. A user could couple one or more nightlights to any corresponding number of faces 32, whatever the desired arraignment of receptacles 30 and faces 32. FIG. 2 also shows a receptacle opening 12, or opening 12 in wall plate 10 for receptacle face 32. The receptacle opening 12 includes an edge or perimeter 13. The faces 32 comprise openings 34 for plug blades 80 and openings or openings for a ground 36. A screw opening or threaded fastener opening 14 in wall plate 10 is also shown between, and vertically offset from upper receptacle opening 12 and lower receptacle opening 12, which can receive a threaded fastener for coupling the wall plate 10 to the receptacle 30.

Figure 3:
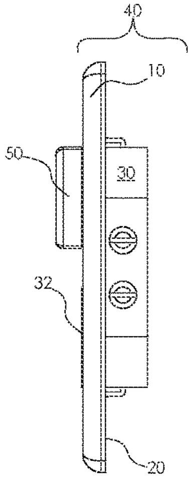
FIG. 3 shows a side view of the tamper resistant nightlight and electrical outlet of FIG. 1.

FIG. 3 shows a side view of the wall plate 10 coupled to the receptacle 30, and the nightlight 50 coupled to the wall plate 10 and the receptacle 30. The view of FIG. 3 is perpendicular or orthogonal to the views shown in FIGS. 1 and 2. The view of FIG. 2 presents the wall plate 10, the receptacle 30, and the nightlight 50 as would be seen if wall 20 did not obscure a view of the receptacle 30 that would be disposed within the wall 20. The nightlight 50 is shown coupled to the upper face 32 of the receptacle 30, the lower face 32 of the receptacle being visible or exposed.

FIG. 4 shows a cross-sectional side view of the wall plate 10, the receptacle and the nightlight 50 (similar to FIG. 3), the view in FIG. 4 being taken along the section line 4 shown in FIG. 2. FIG. 4 provides additional detail of the tamper resistant nightlight 50, including portions of the internal structure of the nightlight 50. The tamper resistant nightlight 50 comprises a body or nightlight body 70. The body 70 further comprises a base 72 that is configured to be disposed over a face 32 of the receptacle 30. The body 70 may comprise a structural element or substrate. The body 70 further comprises at least one circuit 74 disposed over the base 72, the at least one circuit 74 comprising at least one light or light emitting diode (LED) 76. The body 70 further comprises a cover 78 that is aligned with, and is disposed over, the at least one LED 76, the cover 78 being configured to be visible when the nightlight 50 is plugged into the receptacle 30. Plug blades 80 extend from the body 70 and are coupled to the at least one circuit 74 and the light or LED 76, the plug blades 80 being configured to electrically couple with contacts within the receptacle 30.

The housing 60 may be coupled to the body 70, the housing 60 comprising a locking element 62 configured to restrict a child (including a toddler) from removing the nightlight 50, which may lead to the nightlight 70 being lost, misplaced, broken, or unavailable to provide light when desired. Unwanted removal of the nightlight 50 by a child may also expose the openings 34 in the receptacle face 32 to the child, introducing an opportunity for a child to place foreign or unwanted objects within the openings 34 of the receptacle 30, thereby creating an increased safety risk. The locking element 61 may be configured as a flange, lip, tab, ridge, or protrusion 62 that extends away from the body 70 such that a distal edge 63 of the flange 62 is configured to be positioned behind a rear surface 18 of a wall plate 10 to prevent the tamper resistant nightlight 50*n* from being removed from the receptacle 30 while the wall plate 10 is coupled to the receptacle 30. Because the wall plate 10 will usually be coupled to the receptacle 32 with a threaded fastener through opening 14, the nightlight 50 will be more difficult to remove than a conventional friction fit or press fit nightlight. Rather than simply pulling on the nightlight 50 so that the blades 80 are pulled from openings 34 of the receptacle 32, the wall plate 10 will first need to be removed, such as with a screwdriver, which prevents a significant barrier for a child to remove the nightlight 50 from the receptacle 30.

The body 70, and particularly the base 72 and the cover 80 of the body, as well as the housing 60, may be formed entirely or partially of rubbers (synthetic and/or natural) and/or other like materials, glasses (such as fiberglass), carbon-fiber, aramid-fiber, any combination therefore, and/or other like materials; elastomers and/or other like materials, polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials, plastics and/or other like materials, composites and/or other like materials; metals, such as zinc, magnesium, titanium, copper, iron, steel, carbon steel, alloy steel, tool steel, stainless steel, spring steel, aluminum, and/or other like materials, ceramic, stone, wood, cellulose, or other natural materials, and/or any combination or composite of the foregoing. The housing 60 and the body 70 may be formed by, made by, made with, or involve 3-D printing, extrusion, pultrusion, vacuum forming, injection molding, blow molding, resin transfer molding, casting, forging, cold rolling, milling, drilling, reaming, turning, grinding, stamping, cutting, carving, bending, welding, soldering, hardening, riveting, punching, plating, and/or the like.

Because the locking element 60 in the implementation shown in FIGS. 1-6 covers the front of the body 70 and the light 76, the housing 60 may comprise or be made of a transparent or translucent material to allow light or illumination from the light 76 to shine or pass through the housing 60. In some instances, an entirety of the housing 60 may be formed of a translucent material. In other instances, a portion or at least a portion of the housing 60, such as the front face 64 or a portion of the front face 64 may comprise or be formed of translucent material. In any event, the face 64 of the housing 60 may cover the body 70, preventing the nightlight body 70 from being removed from the receptacle 30 while the housing 60 covers the body 70 and the locking element 61 of housing 60 is coupled to the wall plate 10, such as a rear surface 18 of the wall plate 10.

FIG. 5 shows a close-up view of the portion of FIG. 4 shown in the section-line or circle 5 from FIG. 4. FIG. 5 shows an enlargement of approximately 2 times, or at twice the scale, of what was shown in FIG. 4. As shown in FIG. 5, the nightlight 70 may have a footprint of form factor that is less than, or substantially equal to, a footprint or form factor of the face 32 of the receptacle 30. As such, the nightlight 70 may be contained within the housing 60 when coupled to the receptacle 30. When the housing 60 is installed, being disposed around and encompassing the nightlight 70, the flange 62 of the housing 60 is disposed or sits behind the back surface 18 of the wall plate 10 and restricts the locking element from being removed without first removing the wall plate 10. The base 72 may be configured to contact, and be adjacent to, the face 32 of the receptacle 30.

As noted above, FIG. 6 shows an exploded perspective view of the nightlight comprising a housing 60 with a locking element 61 that can be couple to, or integrally or unitarily formed with, the nightlight body 70. The nightlight 50 may be coupled to electrical outlet 40, so as to be tamper resistant and to not be undesirably removed by a child.

FIGS. 7-12 illustrate another implementation of a tamper resistant nightlight 51 similar to the tamper resistant nightlight 50 from FIGS. 1-6, in which like numbers represent like features. Nightlight 51 comprises a body or nightlight body 70 that may be integrally or unitarily formed with, or separately formed and releasably coupled to, a housing 60. The housing 60 of nightlight 51 comprises a locking element 61 that comprising a flange, lip, tab, ridge, or protrusion 62 as a first or rear flange, similar to the flange 62 of nightlight 50.

Nightlight 51 differs from nightlight 50 by further comprising a second or front flange, lip, tab, ridge, or protrusion 65 that is disposed away from, or opposite, the first flange 62. In some instances, the flange 65 may extend to the cover

78 of the body 70 without being disposed over an entirety of the cover 78 of the body 70. In some instances, the housing may contact or cover an entire side of the body 70, and may contact, cover, or be disposed over only a portion or no part of the cover 78 of the body 70, unlike the nightlight 50 shown in FIGS. 1-6. In other instances, the flange 65 of the nightlight 51 may extend to, and mateably couple with, a shoulder, ridge, tab, or protrusion 79 formed on the body 70. When the flange 65 is coupled to the shoulder 79, the housing 60 may not extend to the cover 78, housing 60, and the flange 65, the housing 60 extending a distance less than an entirety of the distance to the cover 78, thereby contacting or covering less than an entire side of the body 70. Stated another way, in some instances the locking element 61 or flange 62 of the housing 60 does not cover the entire nightlight body 70, the cover 78, or the front of the cover 78, but covers only the sides or portions of the sides of the body 70, such as shoulder 79.

FIGS. 13-21 illustrate another implementation of a tamper resistant nightlight 52 similar to the tamper resistant nightlight 50 from FIGS. 1-6 and the tamper resistant nightlight 51 from FIGS. 7-12, in which like numbers represent like features. Nightlight 52 is similar to nightlights 50 and 51 in that nightlight 52 comprises the housing 60 that further comprises the locking element 61 that couples with the back side or rear surface 18 of the wall plate 10. As shown, nightlight 52 comprises an implementation in which the housing 60 is disposed between the receptacle 30 and the base or rear surface 72 of the nightlight body 70. A such, the base 72 of the body 70 may be releasably coupled with the front face 64 of the housing 60, rather than being in contact with the face 32 of the receptacle 30 as shown in the preceding FIGs.

Figure 20:
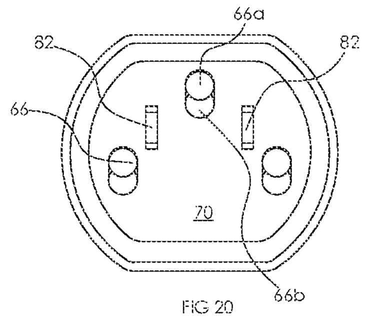
FIGS. 19-21 show various views of the nightlight shown in FIG. 16, including keyhole connectors for coupling the housing with the nightlight body.
Figure 21:
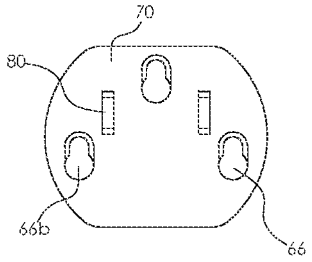

As illustrated more specifically in FIGS. 20-21, the nightlight body 70 or a portion thereof, such as base 72, may be releasably coupled with a portion of the housing 60, such as the front face 64. Base 70 may be coupled to housing 60 with any desirable number of connectors or keyhole connectors 66, which may comprise mateably coupling elements 66*a* and 66*b*. First or male connectors 66*a* may be formed as protrusions, knobs, or keys. Second or female connectors 66*b* may be formed as one or more corresponding slots, openings, sockets, or keyholes. While first connectors 66*a* are shown on nightlight body 70 and second connectors 66*b* are shown in housing 60, the relative arrangement of the first connectors 66*a* and the second connectors 66*b* may be reversed, with the first connectors 66*a* on or coupled with housing 60 and the and second connectors 66*b* in or with nightlight body 70. In some instances, a portion of the first connectors 66*a* may be formed on the housing 60 with another portion of the first connectors 66*a* being formed on the nightlight body 70, while corresponding portions of second connectors 66*b* may be formed on the housing 60 and the nightlight body 70 to mateably couple with the first connectors 66*a*.

Figure 18:
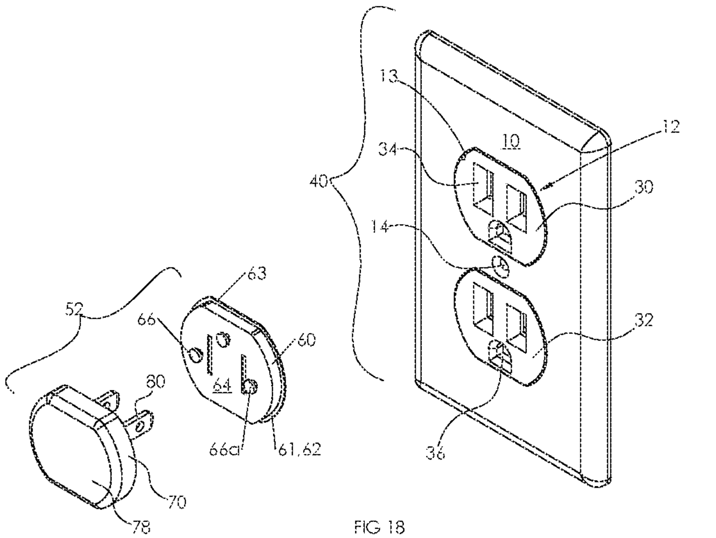
FIG. 18 shows an exploded perspective view of the tamper resistant nightlight and electrical outlet shown in FIGS. 13-17.
Figure 19:
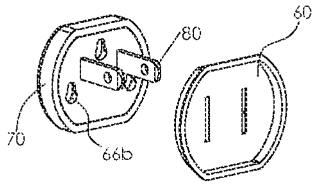
Figure 22:
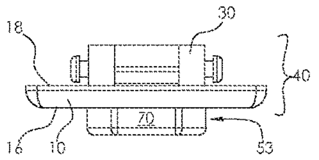
FIG. 22 shows a top view of another instance of a tamper resistant nightlight coupled with an electrical outlet.
Figure 23:
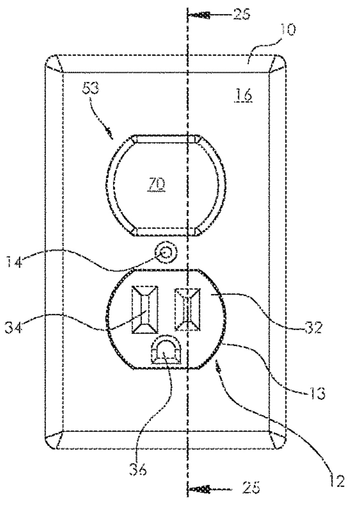
FIG. 23 shows a front view of the tamper resistant nightlight and electrical outlet of FIG. 22.
Figure 24:
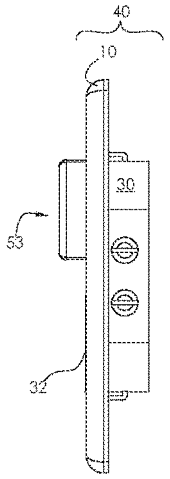
FIG. 24 shows a side view of the tamper resistant nightlight and electrical outlet of FIG. 22.
Figure 25:
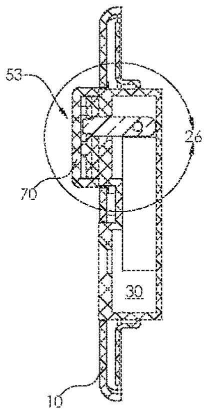
FIG. 25 shows a cross-sectional side view of the tamper resistant nightlight and electrical outlet taken along section-line 25 shown in FIG. 23.
Figure 26:
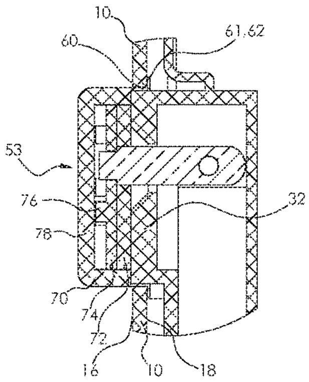
FIG. 26 shows a close-up cross-sectional side view of the tamper resistant nightlight and electrical outlet taken along section-line 26 shown in FIG. 25.
Figure 27:
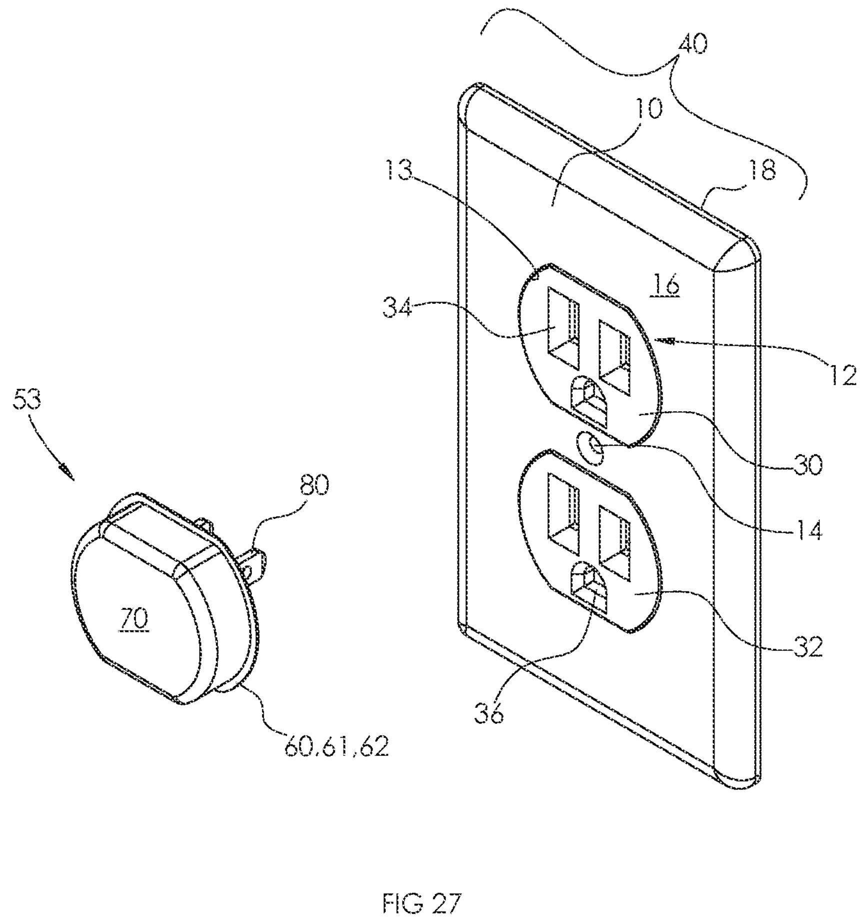
FIG. 27 shows an exploded perspective view of the tamper resistant nightlight and electrical outlet shown in FIGS. 22-26.
Figure 28:
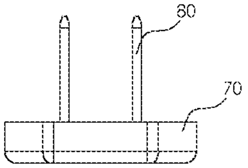
FIGS. 28-34 show various views of a tamper resistant comprising a low-profile body, a photosensor, and a selector switch.
Figure 29:
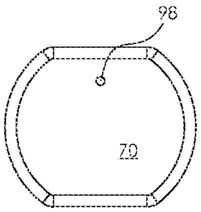
Figure 30:
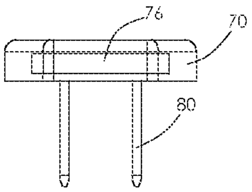
Figure 31:
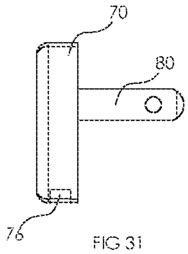

FIGS. 18 and 19 show exploded perspective views, from opposite sides, of the nightlight body 70 and the housing 60, with interlocking keyhole connectors 66. FIG. 20 shows a plan view of a front of the body 70 with the cover 78 removed so that ends 82 of the plug blades 80 are visible, together with first connectors 66*a* inserted within, and couple to, second connectors 66*b*. FIG. 21 shows a plan view of a rear of the body 70, opposite the view shown in FIG. 20, with opposite ends of the plug blades 80 and the second connectors or slots 66*b* being visible.

Coupling of the nightlight body 70 to the wall plate 40 may occur with the housing 60 coupled to the wall plate 10 with locking element 61, and the nightlight body 70 being coupled to the housing 60 when the one or more knobs 66*a* on the nightlight body 70 interlock with slots 66*b* on the housing 60. However, the housing 60 and nightlight body 70 may be removably coupled in another manner with other suitable connectors 66. Further, and as noted above with respect to the previous FIGs., the locking element 61 may have a lip 62 around its edge which, when installed with the electrical outlet 40, sits behind the wall plate 10 and makes it difficult to tamper with or remove the housing 60 without also removing the wall plate 10. When the additional keyhole connectors 66 are included with the housing 60 disposed between the base 72 or body 70 and the receptacle 30 or receptacle face 32, the nightlight body 70 may be removed without removing the wall plate 10, by uncoupling the nightlight body 70 from the housing 60 while leaving the housing 60 coupled to the wall plate 10. Because the wall plate 10 comprises openings 67 for plug blades 80, the receptacle 30 can still be used even when the housing is coupled to the wall plate 10 and the nightlight body 70 has been removed. Additionally, when the nightlight body 70 is on and electrically coupled to the receptacle 30, the keyhole connectors 66 help prevent children from removing the nightlight body 70, and undesirably exposing the openings 34 of the receptacle 30.

FIGS. 22-26 illustrate another implementation of a tamper resistant nightlight 53 similar to the tamper resistant nightlight 50 from FIGS. 1-6 and the tamper resistant nightlight 51 from FIGS. 7-12, in which like numbers represent like features. Nightlight 53 is similar to nightlights 50 and 51 in that nightlight 52 comprises the housing 60 or locking element 61 that couples with the back side or rear surface 18 of the wall plate 10. FIGS. 22-26 show the housing being integrally formed with, or being one continuous piece or the same unitary structure as the nightlight body 70. Stated another way, the locking element 61 may be coupled to the nightlight body 70 (when the nightlight body 70 comprises the housing 60). As described above, the locking element 61 may be formed as a flange, lip, tab, ridge, or protrusion that sits behind the wall plate 10 when installed as part of the electrical outlet 40, making it difficult to remove the nightlight 50 and the body 70 from the receptacle 30 or outlet 40, without removing the wall plate 10.

The implementations of the tamper-resistant nightlights 50, 51, 52, and 53 described herein are configured for a typical wall outlet 40 that utilizes a wall plate 10. However, other implementations are also intended within this disclosure. For example, the locking element 61 may be configured for ground-fault circuit interrupter (GFCI) outlets or decorator devices as well. The implementations which have a nightlight that is separable from the locking element may be used in any electrical device because the locking element may be set aside during use. In addition, tamper-resistant nightlight implementations may include a dusk-to-dawn photosensor 98 and photosensor circuit, as well as a selector switch 90 as discussed below, and as disclosed in U.S. Provisional Patent Application 62/795,805, the disclosure of which is incorporated by reference.

Figure 32:
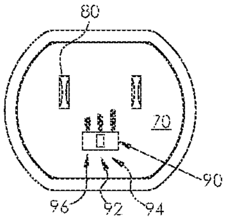
Figure 33:
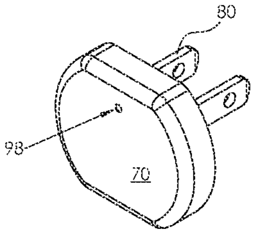
Figure 34:
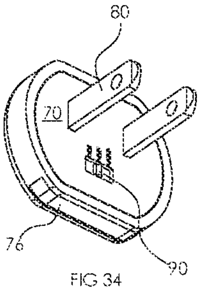

FIGS. 28-34 show various views of a nightlight body 70 that may be used or incorporated with any of the implementations shown and described herewith. The photosensor 98 and the photosensor circuit may detect the ambient light, providing power to the nightlight and the light 76 when limited, reduced, or no ambient light detected; and turning the light 76 off when there is more or sufficient ambient light. As illustrated in FIGS. 32 and 34, the selector switch 90 allows the night light user to switch between different modes: 1) a first position or “on” position 92 of the selector 90 in which the light 76 remains on at all times, 2) a second position or “auto” position 94 to enable the photosensor circuit, thus turning the night light on when the area is dark and turning it off when there is ambient light, and 3) a third position or “off” position 96 of the selector 90 in which the night light remains off.

The nightlight body 70 may advantageously be made with a small profile, making it difficult for a child to grip and therefore remove from the receptacle 30. The footprint or area of the nightlight body 70 may be small, and fit or be contained within the footprint or area of the face 32 of the receptacle 30. As such, a housing 60 and a locking element 61 may be coupled to the nightlight body 70, allowing the locking element 61 to be configured as a flange, lip, tab, ridge, or protrusion 62 that may comprise a thickness in a range of 0.5 millimeters-4 millimeters (mm) and be disposed in a gap or space between the wall plate 10 and the receptacle face 32, such as along the edge or perimeter 13 of the opening 12. While the selector switch 90 is shown on the rear or back surface of the nightlight body 70, the selector switch may be positioned or disposed on any suitable surface, including on a side or other surface.

In particular embodiments of a nightlight body 70 described in relation to any of the various FIGS. 1-34, herein, a front surface of the cover 78 (FIG. 6) may be configured to be touch-sensitive to operate the nightlight. In the specific embodiment described and shown with relation to FIGS. 32 and 34, a selector switch 90 is included to allow a user to switch the nightlight between different modes of operation. In that example, the modes of operation include: 1) a first position or “on” position 92 of the selector 90 in which the light 76 remains on at all times, 2) a second position or “auto” position 94 to enable the photosensor circuit, thus turning the night light on when the area is dark and turning it off when there is ambient light, and 3) a third position or “off” position 96 of the selector 90 in which the night light remains off. As an alternative to or in addition to a selector switch 90, the front surface of the cover 78, or some other portion of the nightlight body 70 may be configured to be touch-sensitive so that a user can alternate between desired modes of operation by merely touching a portion of the body 70.

In this way, the selector switch may be implemented not as a sliding selector switch 90 as shown in FIGS. 32 and 34, but as a different form of touch-sensitive switch. The touch to the nightlight body 70 may activate the selector switch through a push-button switch on the surface that toggles the selector switch through its modes of operation, or through a touch-sensitive surface or area, such as by capacitive sensing, such as through inclusion of a capacitive plate below the surface to interact with the user’s finger to form a capacitive circuit, or conductive sensing, such as inclusion of a titanium oxide or other conductive layer on the surface to conduct a small amount of electricity like with touch-screen technology, to toggle the selector switch through its modes of operation. The modes of operation identified in relation to selector 90 above, or other modes may be implemented. Use of a touch-sensitive surface on the nightlight body 70 simplifies use of the device, allows the selector switch to be changed without removal of the nightlight body 70, and increases functionality and usability of the nightlight.

It will be understood that implementations of this tamper-resistant night light are not limited to the specific components disclosed herein, as virtually any components consistent with the intended operation of various tamper-resistant night lights may be utilized. Accordingly, for example, it should be understood that, while the drawings and accompanying text show and describe particular tamper-resistant night light implementations, any such implementation may comprise any shape, size, style, type, model, version, class, grade, measurement, concentration, material, weight, quantity, and/or the like consistent with the intended operation of tamper-resistant night lights.

The concepts disclosed herein are not limited to the specific tamper-resistant night lights shown herein. For example, it is specifically contemplated that the components included in particular tamper-resistant night lights may be formed of any of many different types of materials or combinations that can readily be formed into shaped objects and that are consistent with the intended operation of the tamper-resistant night light. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, tamper-resistant night lights may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular tamper-resistant night light implementations, it should be readily apparent that a number of modifications may be made without departing from the spirit thereof and that these implementations may be applied to other implementations disclosed or undisclosed. The presently disclosed tamper-resistant night lights are, therefore, to be considered in all respects as illustrative and not restrictive.

What is claimed is:

1. A tamper resistant nightlight comprising:

a body having a base and a translucent cover disposed over the base, and at least one light positioned between the base and the cover;

a locking element extending away from an edge of the body, wherein the locking element is configured to couple with an electrical wall plate and restrict a child from removing the body from an electrical receptacle, and wherein the locking element is configured as a flange that extends away from the body such that a distal edge of the flange is configured to be positioned behind a rear surface of the electrical wall plate when the body is installed on the electrical receptacle, wherein the locking element is formed as a separate ring that is sized to engage around the body and leave at least a portion of the translucent cover exposed;

plug blades coupled to the at least one light and configured to electrically couple with the electrical receptacle through the body; and a touch-sensitive selector switch operatable from a surface of the translucent cover.

2. The tamper resistant nightlight of claim 1, further comprising a photosensor coupled to the at least one light and configured to detect ambient light, turn on the tamper resistant nightlight when ambient light is low, and turn off the tamper resistant nightlight when ambient light is adequate.

3. The tamper resistant nightlight of claim 1, wherein the selector switch is operatable between a first mode in which the tamper resistant nightlight is always on, a second mode in which the tamper resistant nightlight turns on and off based on ambient light, and a third mode in which the tamper resistant nightlight is always off.

4. A tamper resistant nightlight comprising:

a body having a base, a translucent cover disposed over the base, and at least one light positioned between the base and the cover;

a locking element extending away from the base, wherein the locking element is configured to couple with an electrical wall plate and restrict a child from removing the body from an electrical receptacle, wherein the locking element is formed as a separate ring that is sized to engage around the body and leave at least a portion of the translucent cover exposed;

plug blades coupled to the at least one light and configured to electrically couple with the electrical receptacle through the body; and a touch-sensitive selector switch on a surface of the cover, the touch-sensitive selector switch responsive to touch from a user's finger and operable to change an operation setting of the at least one light.

5. The tamper resistant nightlight of claim 4, wherein the locking element is configured as a flange that extends away from the body such that a distal edge of the flange is configured to be positioned behind a rear surface of the electrical wall plate.

6. The tamper resistant nightlight of claim 4, further comprising a photosensor coupled to the at least one light and configured to detect ambient light, turn on the tamper resistant nightlight when ambient light is low, and turn off the tamper resistant nightlight when ambient light is adequate.

7. The tamper resistant nightlight of claim 4, wherein the touch-sensitive selector switch is operatable between a first mode in which the tamper resistant nightlight is always on, a second mode in which the tamper resistant nightlight turns on and off based on ambient light, and a third mode in which the tamper resistant nightlight is always off.

8. A tamper resistant nightlight comprising:

a body having a base, a cover disposed over the base, at least one light positioned between the base and the cover, and plug blades coupled to the at least one light and configured to electrically couple with an electrical receptacle through the base;

a locking element extending away from the body and configured to couple with an electrical wall plate mounted on the electrical receptacle, and restrict a child from removing the body from the electrical receptacle, wherein the locking element is formed as a separate ring that is sized to engage around the body and leave at least a portion of the translucent cover exposed; and a touch-sensitive selector switch on a surface of the body and operable to change an operation setting of the at least one light.

9. The tamper resistant nightlight of claim 8, wherein the locking element is configured as a flange that extends away from the body such that a distal edge of the flange is configured to be positioned behind a rear surface of the electrical wall plate.

10. The tamper resistant nightlight of claim 8, further comprising a photosensor coupled to the at least one light and configured to detect ambient light, turn on the tamper resistant nightlight when ambient light is low, and turn off the tamper resistant nightlight when ambient light is adequate.

11. The tamper resistant nightlight of claim 8, wherein the touch-sensitive selector switch is operatable between a first mode in which the tamper resistant nightlight is always on, a second mode in which the tamper resistant nightlight turns on and off based on ambient light, and a third mode in which the tamper resistant nightlight is always off.

* * * * *